Dec. 23, 1969 L. JULIE 3,486,110

RMS SIGNAL MEASUREMENT AND CONVERSION USING FIXED-LEVEL POWER-SENSITIVE NULLING NETWORKS

Filed Aug. 25, 1967 3 Sheets-Sheet 1

United States Patent Office

3,486,110
Patented Dec. 23, 1969

3,486,110

RMS SIGNAL MEASUREMENT AND CONVERSION USING FIXED-LEVEL POWER-SENSITIVE NULLING NETWORKS

Loebe Julie, New York, N.Y., assignor to Julie Research Laboratories, Inc., New York, N.Y.

Filed Aug. 25, 1967, Ser. No. 663,341
Int. Cl. G01r 17/06
U.S. Cl. 324—99 9 Claims

ABSTRACT OF THE DISCLOSURE

A system for the precision RMS measurement and/or conversion of electrical signals comprised of a nulling network formed of power-sensitive elements such as thermistors or thermocouples, in a circuit arrangement whose characteristic feature is that the null output is always produced at the same predetermined level of power input to the network, irrespective of the level of the input signal to the system. The output of the network, when off the null condition, is used as an error signal to actuate a servo control mechanism for automatically adjusting one or more system parameters outside the network so as to change the level of the input to the network in a direction to restore the null condition.

*Embodiment* 1.—An RMS digital voltmeter/converter in which the network output signal controls the resistance setting of a precision attenuator, which is in series with the network and the system input signal being measured, so as to maintain the network at the null condition. A phase-sensitive circuit, referenced to the system input, enables the control loop to be responsive to the polarity of the error signal so as to adjust the attenuator in the right direction to restore the network null. A digital counter drives the setting of the attenuator and also provides a visual read-out for the voltmeter device. In addition the system functions as an RMS signal converter of relatively low accuracy through the provision of a second attenuator, ganged to the first, which is connected as an adjustable voltage divider across an internal voltage source, the combination serving to produce an output signal for the system which is the RMS-equivalent of the input signal.

*Embodiment* 2.—An improved accuracy RMS signal converter in which the nulling network is comprised of two isolated circuit branches A and B, each having a power-sensitive element, which are matched to produce a null output for the same predetermined input level. Branch A, which is coupled to the input signal $e_1$ that is to be converted, generates an error signal output for actuating a first servo loop controlling the common setting of a pair of matched attenuators associated with each of the two circuit branches. Branch B, which is coupled to a second signal source $e_2$ which acts as the output signal of the converter, in turn generates an error signal which through a second servo loop adjusts the voltage level of $e_2$ so that it is the RMS equivalent of $e_1$.

*Embodiment* 3.—A high precision, wide range RMS signal converter in which the previous embodiment is modified to include a third signal source $e_3$ which is coupled to both branches A and B of the power-sensitive network so as to add in RMS fashion to each of the signals $e_1$ and $e_2$ respectively. The amplitudes of the two signal sources $e_2$ and $e_3$ are adjusted, by respective servo loops actuated by corresponding control signals derived from the outputs of the two branches of the network, so that for any value of input signal $e_1$ the matched operated level for null is restored across both branches, whereupon $e_2$ is the RMS equivalent of $e_1$ and the desired RMS signal conversion between input and output signals is obtained. To increase the amplitude range of input signals capable of being handled by the converter, a volage level capable of being handled by the converter, a voltage level sensor, which is responsive to the amplitude of $e_3$, acts through a third servo loop, when either a high or low amplitude limit value on $e_3$ is reached, to change the common setting of a pair of matched range attenuators respectively connected to each of the two circuit branches of the power-sensitive network.

BACKGROUND OF THE INVENTION

The present invention relates to circuitry for the measurement and conversion of electrical signals utilizing a nulling network formed of one or more power-sensitive elements. At a predetermined input power level to the network, a null (no signal) output is produced; any deviation in either direction from the predetermined input power level causes an output which is used as an error or control signal in a servo loop for automatically adjusting an appropriate electrical characteristic of any one of various active or passive circuit elements, coupled to the network, so as to restore the null or balance condition to the network. The distinctive novelty of the circuit approach described herein resides primarily in the use of power-sensitive elements, such as thermistors or thermocouples, which are arranged in a bridge or comparator network so that, in the balance condition, the network always has the same predetermined power level impressed across its input, regardless of any changes which may have occurred in the electrical parameters of other circuit elements in the system. In this manner a highly sensitive and precise measurement and conversion can be made of the RMS or true power level of an applied electrical signal, irrespective of its waveform.

In the most direct application of the teachings of the present invention a power-sensitive nulling network is used as the basis for a new type of RMS digital voltmeter which, unlike conventional AC meters which are correctly calibrated only for a sinusoidal waveform, is responsive to the true RMS value of the signal which is to be measured, regardless of its waveform. By the optional addition to the voltmeter circuit of an adjustable internal voltage source the device may be used as a low grade RMS signal converter.

In a second embodiment of the invention, which is an RMS signal converter of improved accuracy, the nulling network is in the form of two isolated circuit branches, each with an associated power-sensitive element, which are matched so that each branch produces a null output for the same level of power input. In this manner a comparator circuit is fashioned which, through the use of suitable servo control mechanisms working in conjunction with a paired set of precision attenuators, can then be used to equate the respective power levels of different voltage sources, so as to effect the RMS conversion of a first signal into a second signal of a different waveform.

The third embodiment of the invention is also an RMS signal converter, but with greater inherent accuracy and range than that of the previous systems, since it utilizes an additional signal source coupled to both of the circuit branches of the nulling network in addition to a pair of attenuators serving as range selectors. This latter type of converter, with the exception of the range selection circuitry, is similar in operation to the RMS converter system disclosed in a copending application of the same inventor, Ser. No. 627,846, filed Apr. 3, 1967.

As mentioned previously, the common concept in all these disclosed embodiments is the use of a nulling network which is comprised of one or more power-sensitive elements and which produces a zero output only for a single, set value of the input power level to the network. In this respect these systems differ materially from prior art nulling or bridge networks which have also been comprised of power-sensitive elements and have been used for the RMS measurement and conversion of electrical signals. In such prior art circuits, which are employed in commercial so-called "true" RMS meters, the input signal which is to be converted (for example an AC signal) is fed to one branch of a Wheatstone bridge arrangement formed of either thermocouples or thermistors, a separate signal source of different waveform (e.g., a battery source of DC potential) is connected to the other branch, and the output or converted signal is derived through the adjustment of the magnitude of the latter signal to achieve bridge balance. However, the operating point for the bridge balance condition is not constant, but instead varies dependent upon the amplitude of the input signal. Since it is extremely difficult, if not practically impossible from an economic standpoint, to obtain a pair of power-sensitive elements whose characteristics are so identical that they will remain matched over a substantial range of operating points, the accuracy of such conventional bridge comparator circuits is inherently limited when used for precision RMS measurement and conversion purposes.

Summary of the invention

The present invention overcomes the technical deficiencies of prior art devices by providing a novel design approach which avoids the necessity of using a power-sensitive nulling network comprised of pairs of closely-matched components of identical electrical characteristics in order to achieve high accuracy RMS signal measurement and conversion. The approach is based on a unique power-sensitive nulling network which, through the automatically-controlled adjustment of one or more system parameters which are outside the network itself but connected in the same electrical circuit, is always restored in the balance condition to the same, singular operating point, irrespective of the amplitude of the input signal to the system which is to be measured and/or converted. Thus, unlike conventional devices, the accuracy of the present system for RMS signal measurement and/or conversion is independent of any requirement for linearity or matching of components in the power-sensitive nulling network.

In a first exemplary embodiment of the invention, in the form of a combined RMS digital voltmeter/converter for measuring and converting the power level of an applied AC or DC signal, the input signal is series connected through a precision attenuator (which is variable in decimal increments) to a nulling network comprised of a power-sensitive element and arranged so that the output of the network is nulled only at a single predetermined input level to the network. Any deviation in the network output away from the null condition, in response to a change in the system input signal, acts as a control signal for a servo loop which adjusts the resistance setting of the attenuator and thus the voltage drop thereacross, in the direction and amount required to restore the predetermined voltage level across the network and return it to the null condition. A bidirectional digital counter in the servo control loop keeps account of the incremental changes made in the resistance setting of the attenuator in response to variations in the system input signal, and thus acts as a visual read-out for the instrument displaying in digital terms the RMS level of the input signal. Signal conversion of the input signal into an output signal of different waveform but having an equivalent power level is effected by having the resistance setting of a second attenuator ganged in common with that of the first so that it acts as a controllably adjustable voltage divider for an internal source of potential, the net voltage from the combination constituting the output of the system.

In a second embodiment, an RMS signal converter of greater accuracy than the first, the nulling network is comprised of two isolated circuit branches A and B, each having a respective power-sensitive element, which are matched to produce a null output for the same predetermined power level. Branch A is connected through a first precision attenuator to the input signal $e_1$ which is to be converted, and branch B is similarly connected through a second decade attenuator (whose resistance is closely matched to the first) to a variable potential source $e_2$ which acts as the output signal of the converter.

Now, any deviation away from null in the output of branch A of the network, reflecting a change in the input signal $e_1$, acts as a control signal for a first servo loop which drives both attenuators in common to change their respective resistance settings to a new value which restores the voltage level across branch A to the original amplitude, thereby returning this branch to the null condition. At the same time branch B of the network moves away from null, due to the change in its associated attenuator setting, and the resulting output of this branch acts as a control signal for a second servo loop which varies the amplitude of the voltage source $e_2$ in a direction so as to restore the null to branch B. (Thus in the circuit of branch B both its attenuator and its voltage source $e_2$ are adjusted by the action of two respective servo loops in response to changes in the input signal $e_1$). When branch B, like branch A, is returned to the null condition in the above-described manner then, since (1) the resistance settings of both attenuators are always maintained equal when any adjustment is made and (2) both power-sensing branches of the nulling network again have the same predetermined level of potential applied to each, the output sources $e_2$ must therefore be at a value which is the RMS equivalent of the input signal $e_1$, and the desired signal conversion is obtained.

The third embodiment of the invention is a somewhat modified version of the RMS converter embodiment just described and possesses greater accuracy and a wider range of operation. In this last embodiment an additional variable potential source $e_3$ is included in the system which is coupled to both branches A and B in a manner so as to add RMS-wise to the voltage levels supplied respectively to each of the branches by the input source $e_1$ and the output source $e_2$. The amplitudes of the two variable signal sources $e_2$ and $e_3$ are adjusted, by respective servo loops actuated by corresponding control signals derived from the outputs of the two branches of the nulling network, so that, for any value of the input signal $e_1$, the matched voltage level for a null output is restored across both branches, with the result that the output voltage source $e_2$ is thus set at the same RMS power level as the input signal $e_1$, and the desired signal conversion is obtained.

In order to extend the amplitude range of input signals capable of being handled by the converter, a matched pair of ranging attenuators are provided for the two circuit branches forming the nulling network in this third embodiment. The ranging resistors are automatically connected, as required, into the respective branch circuits by a third servo loop which is activated in response to changes beyond high and low threshold points in the amplitude level of the source $e_3$. Thus, irrespective of the magnitude of the variations in the level of the input signal $e_1$, it is only necessary, by virtue of the presence of the ranging attenuators, to adjust the variable voltage source $e_3$ within a relatively narrow range of amplitude in restoring the nulling network to the predetermined operating point where both branches are matched for null output.

It is therefore a principal objective of the present invention to provide a novel and improved method and apparatus for the RMS measurement and conversion of electrical signals.

It is a specific objective of the present invention to provide a precision RMS digital voltmeter of novel design which is inherently more accurate in the measurement of the power levels of electrical signals of diverse waveform than conventional RMS voltmeter devices heretofore known.

It is another specific objective of the present invention to provide a precision RMS converter for transforming electrical signals of one waveform into RMS-equivalent signals of a different waveform which is both inherently more accurate and operable over a far wider range of signal amplitudes than conventional RMS converters heretofore known.

It is a principal feature of the present invention that electrical systems constructed according to its teachings employ a nulling network, formed of one or more power-sensitive elements, which is nulled by the automatic adjustment of one or more system parameters outside the network so as to maintain the voltage applied to the input of the network at a constant predetermined level, irrespective of the amplitude of the input signal to the system.

The foregoing and other objectives, features and advantages of the invention will be more readily understood upon consideration of the following detailed description of the invention, taken in conjunction with the accompanying drawings.

DESCRIPTION OF THE PREFERRED EMBODIMENTS

Figures 1, 1A, 1B:
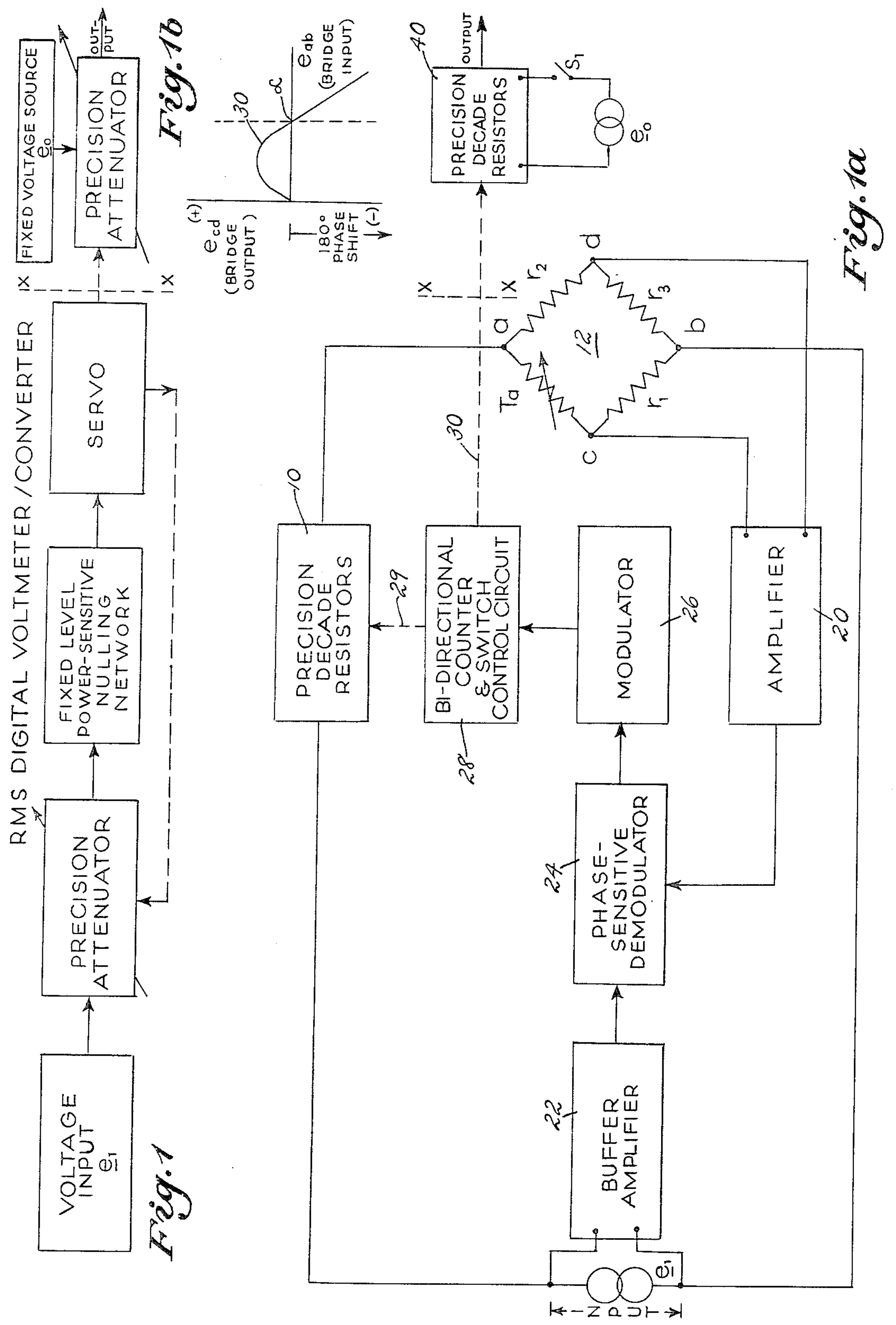
FIG. 1 is a block diagram of an RMS digital voltmeter/converter having a power-sensitive nulling network and embodying the principles of the present invention.
FIG. 1*a* is a partly schematic and partly block diagram of an examplary circuit for the RMS digital voltmeter/converter embodiment of FIG. 1.
FIG. 1*b* is a curve diagram which will be useful in explaining the operation of the servo loop portion of the circuit of FIG. 1*a*.

Referring now to FIG. 1, there is shown a simplified block diagram of a combined RMS digital voltmeter/converter according to the present invention. The signal source $e_1$, whose voltage level is to be measured, is series connected through a servo-controlled digital attenuator (that is, an attenuator whose resistance is variable in predetermined equal increments) to a fixed level power-sensitive nulling network. The network characteristic is that it will generate a null, i.e., a zero or other known signal output (for example, one volt), at a single predetermined value of input power level to the network—for any other input level the network generates an output voltage different from the null value which is representative of the direction and amount of deviation of the instantaneous input level from the predetermined value. The output of the network is used as an error signal to actuate a servo control loop for adjusting the resistance of the attenuator element to a value such that voltage applied to the network is maintained at, or restored to, the predetermined level which produces a null ouput. The reading of the voltmeter is then obtained by noting the value of the attenuator resistance required to restore or maintain the network null and comparing this resistance value to a known set of operating conditions.

Unlike conventional digital voltmeter devices which typically respond to the average or DC value of the input signal and thus are only correctly calibrated for a pure sine wave, the voltmeter of the present invention is responsive to the RMS or power level of the applied signal and thus the accuracy of its reading is unaffected by the nature of the signal's waveform. Furthermore, since the power-sensing element of the device is always restored to the same operating point when the network is nulled, the degree of linearity in voltage response possessed by the power-sensing element is immaterial to the accuracy of the voltmeter.

For optional converter operation, the basic voltmeter scheme is additionally provided with the circuit elements shown to the right of the line X—X in FIG. 1*a*, comprising a fixed source of voltage potential $e_0$, and a second precision attenuator whose setting is commonly controlled like the first attenuator by the servo loop. This second attenuator functions as a voltage divider to fractionally apportion the voltage level $e_0$ so that the part which appears as the output of the system at all times bears a fixed ratio (e.g., 1:1) to the input voltage level $e_1$. Since both of the precision attenuators are ganged together and controlled by the same servo loop, the converter system, once initially calibrated to establish a close degree of match between the respective attenuator resistors, will provide a reasonably accurate RMS conversion on the input signal to the system. However, the accuracy of the conversion system will be deleteriously affected over any substantial period of operation by the mismatch which will inevitably occur due to temperature ageing of the nulling network and the drifting in the level of the fixed voltage source $e_0$. For this reason the system embodiment of FIG. 1 is recommended principally for voltage metering purposes, and it is only as an incidental feature that mention is made of the optional additional circuit components which enable this system to be operated also as an RMS signal converter.

FIG. 1*a* is a schematic diagram of a suitable circuit for an RMS digital voltmeter/converter of the proposed type, with block representations being used for some of the conventional circuit elements. The voltage source $e_1$ represents an input signal whose RMS or power level is to be measured, and, for purposes of generality, this signal can be considered to be of any waveform, e.g., DC, AC, periodic or aperiodic. The attenuator is in the form of a precision decade resistor box 10 whose resistance is adjustable in decimal increments in response to the setting of control switches. The nulling network, which together with the attenuator is connected in series across the input source $e_1$, comprises a Wheatsone comparison bridge 12 having a power-sensitive thermistor element $T_a$ in the upper lefthand arm and conventional resistors $r_1$, $r_2$, $r_3$ in the other three arms of the bridge. As shown in the diagram, the input potential to the bridge is applied across the upper and lower terminals *a* and *b*, and the output of the bridge is derived across the other two terminals *c* and *d*.

By reason of the presence of a thermistor element $T_a$ in one arm of the bridge 12 there is one and only one applied voltage $e_{ab}$ which will result in a zero signal or null for the voltage $e_{cd}$ appearing across the middle terminals of the bridge. This is so, as will be readily understood by those skilled in the art, because the thermistor, being a power-sensitive element, will present a resistance to current flow through the left-hand branch of the bridge which varies as a function of the root-mean-square value of the applied potential $e_{ab}$, whereas the right-hand branch of the bridge will have a constant ohmic value independent of the applied voltage level. Therefore there will be a unique value of the applied bridge potential $e_{ab}$ which will produce identical voltage drops at the mid-terminal points *c* and *d* of the bridge so as to result in a zero potential difference and a null value for the bridge output $e_{cd}$. The variation in the output of the bridge as a function of the bridge input is represented by the curve 30 in FIG. 1*b*, with the input voltage value which produces a null output being indicated as the point $\alpha$.

Considering again the circuit of FIG. 1*a*, the bridge 12 is initially adjusted, by the selection of suitable values for the resistor arms $r_1$, $r_2$ and $r_3$, so that a null output appears across the terminals *c*, *d* for a predetermined level of potential E applied to the bridge input $e_{ab}$. For any other level of potential applied to the bridge input the resulting output will not be zero, and it is the function of the remaining elements shown in block form in the circuit to adjust the setting of the attenuator, either by increasing or decreasing the resistance in series with the bridge input, so as to restore the null output from the bridge.

Since the output $e_{cd}$ of the bridge 12, when it moves from a null value due to a change in the signal input $e_1$, is in the form of an alternating signal, it is necessary to provide a phase reference in the servo loop so as to determine the proper direction in which the attenuator 10 is to be adjusted in order to restore the bridge to balance. As can be seen from the curve of FIG. 1*b*, which is a plot of bridge output $e_{cd}$ vs. bridge input $e_{ab}$, there is a phase shift of 180° in the output when the input voltage increases beyond the predetermined voltage level at the point $\alpha$. This phase-shifting characteristic can be used as a polarity indicator to determine the direction for adjustment of the attenuator.

As shown in the circuit of FIG. 1*a*, the bridge output $e_{cd}$, after suitable amplification at 20, is applied as a phasing signal to a demodulator 24 which receives as a primary input an alternating waveform which is derived directly from the signal input $e_1$. A buffer amplifier 22 is used to pick off the signal $e_1$ in order to prevent any loading effect on the signal to be measured by virtue of the presence of the servo loop. Depending upon the phase relationship of the bridge output voltage $e_{cd}$ to the signal input $e_1$, the output of the demodulator 24 will be of either positive or negative polarity, or of zero amplitude in the event that the bridge 12 is at balance. Thus the polarity of the demodulator output is indicative of whether the instantaneous bridge input $e_{ab}$ is less than or greater than the predetermined level E required for nulling of the bridge output.

The output of the demodulator 24 is then used as an input to a modulator 26 which may be in the form of a free-running multivibrator whose pulses are gated and polarized in accordance with the presence (or absence) and polarity of the modulator signal input. The output of the modulator 26 in turn is supplied to a counter 28 which arithmetically accumulates the pulses received from the modulator and, in response to the instantaneous pulse total, actuates corresponding switch control circuits which are electrically or electromechanically coupled by connection 29 to the switching arms of the decade resistor box 10. Thus, in response to the accumulation of pulses in the bidirectional counter 28, the total going up or down depending upon the polarity of the modulator pulses, the resistance setting of the attenuator 10 is varied in digital increments in an amount and in a direction so as to produce a corresponding voltage drop across the attenuator which is just sufficient, when subtracted from the signal input voltage $e_1$, to result in a voltage of magnitude E appearing across the input of the bridge 12 and restoring its null output. (It is apparent of course that, for the voltmeter circuit of FIG. 1*a* to measure satisfactorily signal inputs of magnitude less than the bridge balance voltage E, suitable linear amplification or stepping transformer means (not shown) must be provided at the input to proportionally scale the signal $e_1$ to amultiplied value $e_1'$ which is greater than E. Also, to minimize or eliminate the "loading" effect of the voltmeter on the input signal $e_1$ being measured, it may in some cases be desirable to insert a buffer amplifier between the signal source and the input leads of the circuit.)

The numerical display or read-out of the digital voltmeter may be provided by suitable indicia associated with either the bidirectional counter 28 or the switch settings for the decade resistor box 10, as both the arithmetic total of the pulses accumulated in the counter and the resistor settings for bridge balance are each accurately representative of the amount by which the signal input $e_1$ exceeds the known value E. Thus, once the device is calibrated by balancing of the bridge 12 for a null output when an input voltage of known value is applied, and the reading of the display derived from either the setting of the attenuator 10 or the pulse count in the counter 28, the voltmeter system shown in FIG. 1*a* will accurately record and display the RMS level of any input voltage $e_1$ applied to its terminals, regardless of waveform. Alternately, the numerical read-out display may be dispensed with in applications where the system is used, not as a voltmeter, but as a precision RMS digital level sensor in which the null-adjusted settings of the attenuator 10, in conjunction with the associated switches, control directly the operation of a utilization device such as the input to the arithmetic section of a computer.

The optional converter operation is provided by the combination of a second precision attenuator 40, formed of a set of decade resistors, and a fixed source of potential $e_0$ which may typically be a signal source of differing waveform from signal $e_1$. Thus, for example, source $e_1$ might be an AC signal and the internal source a DC potential supplied by a battery so that the system would function, in additional to a voltmeter, as an AC-to-DC converter.

The optional converter feature of the system, which is provided by the circuit elements to the right of the line X—X in the diagram of FIG. 1*a*, is brought into operation by the closing of switch $S_1$ which connects source $e_0$ across the voltage divider attenuator 40. The setting of the divider 40 is controlled by the output of the switch control unit 28 which is mechanically or electromechanicaly coupled thereto via a connection 30. Thus the respective settings of both of the attenuators 10 and 40 are commonly adjusted from the same control unit in response to the error signal derived across the output of the bridge network 12. Consequently the resultant output signal tapped off the divider 40 will maintain a fixed numerical relationship to the input voltage $e_1$, irrespective of changes in the latter's signal level. Since only the absolute power level or RMS value of the signal input $e_1$ is sensed by the bridge element 12, the converter output, as determined by the setting of the voltage divider 40, will always be related on an RMS basis to the input signal level.

As mentioned earlier, the converter aspect of the system shown in this circuit embodiment suffers from certain inherent disadvantages in long-term accuracy due to the unavoidable result of temperature ageing and drift in the system components. These deficiencies are corrected in the converter embodiments now to be described.

Figure 2:
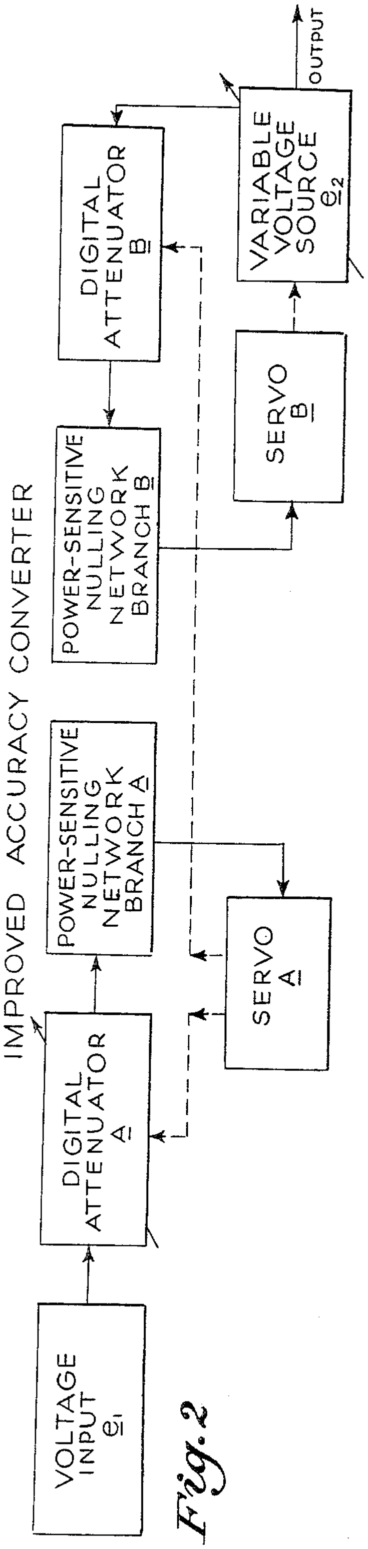
FIG. 2 is a block diagram of an improved RMS signal converter embodiment of the present invention.

FIG. 2 is a block diagram of an improved RMS signal converter constructed according to the principles of the present invention. A power-sensitive nulling network comprised of a pair of isolated circuit branches is employed, in conjunction with a matched pair of servo-controlled precision attenuators, to effect the conversion of an input signal $e_1$ into an output signal $e_2$ which is of equivalent or proportional RMS value. The left-hand or A portion of the converter system shown in FIG. 2 is generally similar to that of the digital voltmeter portion of the embodiment of FIG. 1. It, like the first system, is comprised of a source of input signal $e_1$ which is to be converted into an RMS-equivalent signal, a digital attenuator, a first brance of a power-sensitive nulling network, and a servo control loop. In a manner similar to that of the previously described embodiment, the A circuit portion of the system functions to maintain the input level to the network branch a constant value through automatic adjustment of the resistance setting of the attenuator in response to changes in the signal input $e_1$.

The right-hand or B portion of the converter comprises a series-connected circuit formed of a variable voltage source $e_2$ acting as the output signal of the system, another digital attenuator with resistance values matched to the first, a second network branch B isolated from the first branch, and an associated servo loop receiving the output of branch B as an error signal and controlling the amplitude level of the output source $e_2$. As is represented in the diagram, the servo loop in the A circuit portion controls the respective settings of both of the digital attenuators so that, as changes in settings are made, the series resistance inserted in each circuit portion remains equal. Thus, when the resistance setting of the attenuator in the A circuit has been adjusted by its servo control loop so as to null the output of the A network branch, exactly the same amount of resistance is provided in the B circuit by the second attenuator.

With the setting of the attenuator in the B circuit now fixed, the level of the signal source $e_2$ is varied, as necessary under the control of the second servo loop, so as to produce a null or zero output from the network branch B. When this condition occurs, that is, with both of the network branches A and B being balanced, then, to the extent of precision that the respective resistors in the two attenuators have been matched togeher in ohmic value, the output voltage $e_2$ of the system possesses the equivalent RMS amplitude level as that of the input source $e_1$, and the desired RMS signal conversion has been achieved.

Furthermore, the effects of temperature ageing and drift in altering the characteristics of the power-sensing elements are compensated, since for practical purposes it may be assumed that both of the two nulling branches A and B will age and drift equally in the same direction. Thus, unlike the previously-described converter embodiment, improved accuracy is attainable by the present embodiment since the converter system of FIG. 2 inherently possesses long-term calibration stability.

Figure 2A:
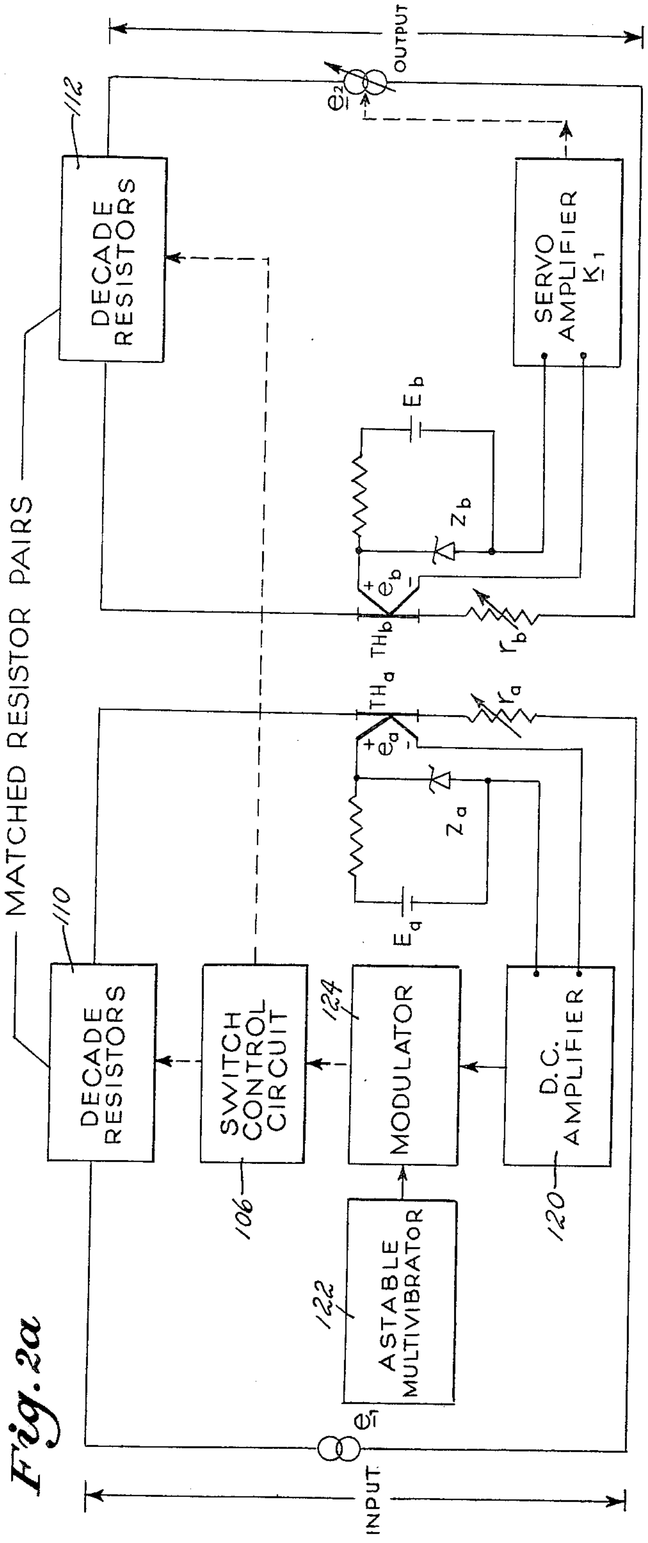
FIG. 2*a* is a partly schematic and partly block diagram of an exemplary circuit for the improved RMS signal converter embodiment of FIG. 2.

FIG. 2*a* is a schematic diagram of an exemplary circuit for the improved RMS signal converter embodiment of FIG. 2, employing a power-sensitive nulling network in the form of a pair of isolated thermocouple branches. The input signal source $e_1$ is connected through a first decade resistor box 110 to a first thermocouple $TH_a$ provided with a trimmer resistor $r_a$ for adjusting its output to a predetermined level during the initial calibration stage of the system.

As stated above, the left-hand portion of the converter system of FIG. 2*a* functions in similar fashion to that of the digital voltmeter portion of the embodiment described previously. Thus the output voltage developed across the thermocouple $TH_a$ is used to actuate a servo loop for adjusting the resistance setting of the attenuator 110 to maintain a predetermined voltage drop across the thermocouple $TH_a$. In the present system the servo loop is of somewhat different design since the error signal is in the form of a DC output $e_a$ from the power-sensing element, rather than an AC signal as in the case of the thermistor bridge used in the previous embodiment.

In the servo control loop of FIG. 2*a* the output $e_a$ of the thermocouple $TH_a$ is compared against a reference voltage level, established in conventional fashion by a source of DC potential $E_a$ which back-biases a Zener diode $Z_a$. Depending upon whether $e_a$ (which reflects the RMS value of the voltage drop across the thermocouple $TH_a$) is greater or less than the threshold level of the Zener, either a positive or a negative polarity error signal will be derived.

The error signal, after amplification at 120, is applied as one input to a modulator 124. A second input to the modulator is a continuous train of pulses supplied from a free-running or a stable multivibrator 122. Depending upon the polarity of the error signal input, the output of the modulator 124 will be a pulse train of corresponding positive or negative polarity. In the event that the thermocouple output $e_a$ equals the reference voltage, then the error signal is zero, and the modulator output is consequently also zero.

Thereafter, the pulse output of the modulator 124 is applied as an input to a switch control circuit 106 which incrementally steps the respective settings of the decade resistor 110 in its circuit loop as well as that of a second attenuator 112 in the right-hand circuit portion of the system. The two attenuators 110 and 112 are thus effectively ganged together so that both insert an equal amount of resistance in their respective circuit loops in response to polarized actuating pulses delivered to the switch control element 106. To the above end, the respective resistors used in the two decade attenuators are selectively matched together in pairs.

From the above description it will be seen that the first servo loop, in the left-hand portion of the circuit shown in FIG. 2*a*, operates to maintain the voltage across the thermocouple $TH_a$ at a constant level, irrespective of changes in the amplitude level of the input signal $e_1$. Turning now to the remaining portion of the circuit, a second thermocouple $TH_b$, with trimming resistor $r_b$, is connected in a series circuit with the decade attenuator 112 and a variable voltage source $e_2$. (If it were desired for the circuit of FIG. 2*a* to act as an AC to DC converter, then $E_2$ would of course be a DC potential source. In any event the voltage source $E_2$ functions as the output of the system.)

A second servo loop, monitoring the voltage output $E_b$ of the thermocouple $TH_b$, adjusts the level of the potential source $E_2$ so as to maintain the thermocouple at a constant predetermined level, irrespective of changes in the resistance setting of the attenuator 112. In operation this second servo loop compares the thermocouple DC output $e_b$ with a stable reference voltage provided by the combination of the battery $E_b$ and the Zener $Z_b$, and supplies a polarized DC error signal to the input of a servo amplifier $K_1$ of conventional design. The output of the servo $K_1$ serves via a mechanical (or alternatively, electrical) coupling to vary the amplitude level of the signal source $e_2$ in accordance with the error signal. The operation of the automatic control loop is such that the servo amplifier $K_1$ adjusts the level of the source $e_2$ in a direction so as to minimize the input signal to the servo, thus in effect maintaining the voltage drop across thermocouple $TH_b$ at a constant value.

By initial calibration, with the use of the respective trimming resistors $r_a$ and $r_b$, the two thermocouples $TH_a$ and $TH_b$ are matched so that the predetermined voltage level at which each is maintained in its associated circuit portion is the same. In other words, both thermocouples are matched to produce an identical output for the same, singular operating point. With both the thermocouples $TH_a$ and $TH_b$ as well as the attenuators 110 and 112 matched as precisely as practicable, it therefore follows that, when both the left-hand and right-hand circuit portions are balanced for null error signals in their respective servo loops, i.e., $e_a=E_a$ and $e_b=E_b$), then the RMS value of the input signal $e_1$ equals the RMS value of the output signal provided by the source $e_2$, and the desired signal conversion is obtained.

It is important to make note of the fact that the two thermocouples $TH_a$ and $TH_b$, which together act as the power-sensing network for the converter system of FIG. 2*a*, are each continuously maintained (by their respective servo loops) at the same potential level, irrespective of changes in the amplitude of the input signal $e_1$. Thus, unlike prior art devices for RMS signal measurement and conversion, it is not necessary in the system of the present invention to employ power-sensitive elements which are so identical that they possess matched electrical characteristics over a substantial operating range. The necessity for obtaining such a match in the power-sensitive elements is avoided in the operation of the present apparatus by always resorting the two power-sensitive elements to a balance condition at the same, singular operating point (irrespective of the amplitude of the input signal to the system) and using instead a pair of closely matched precision attenuators to effect the requisite adjustments in the system in response to amplitude changes in the input signal. Thus, for the costly if not impractical expedient of obtaining a pair of thermocouples or other power-sensitive elements of closely matched characteristics, there is substituted the use of paired resistance elements which, on a present basis, can readily and inexpensively be matched together within a tolerance of 0.01%. Additionally, since the power-sensitive elements as well as the matched resistance elements will tend to age identically by the same amount, the calibration of the system should remain valid, without the need for re-adjustment, over long periods of time.

Figures 3, 3A, 3B:
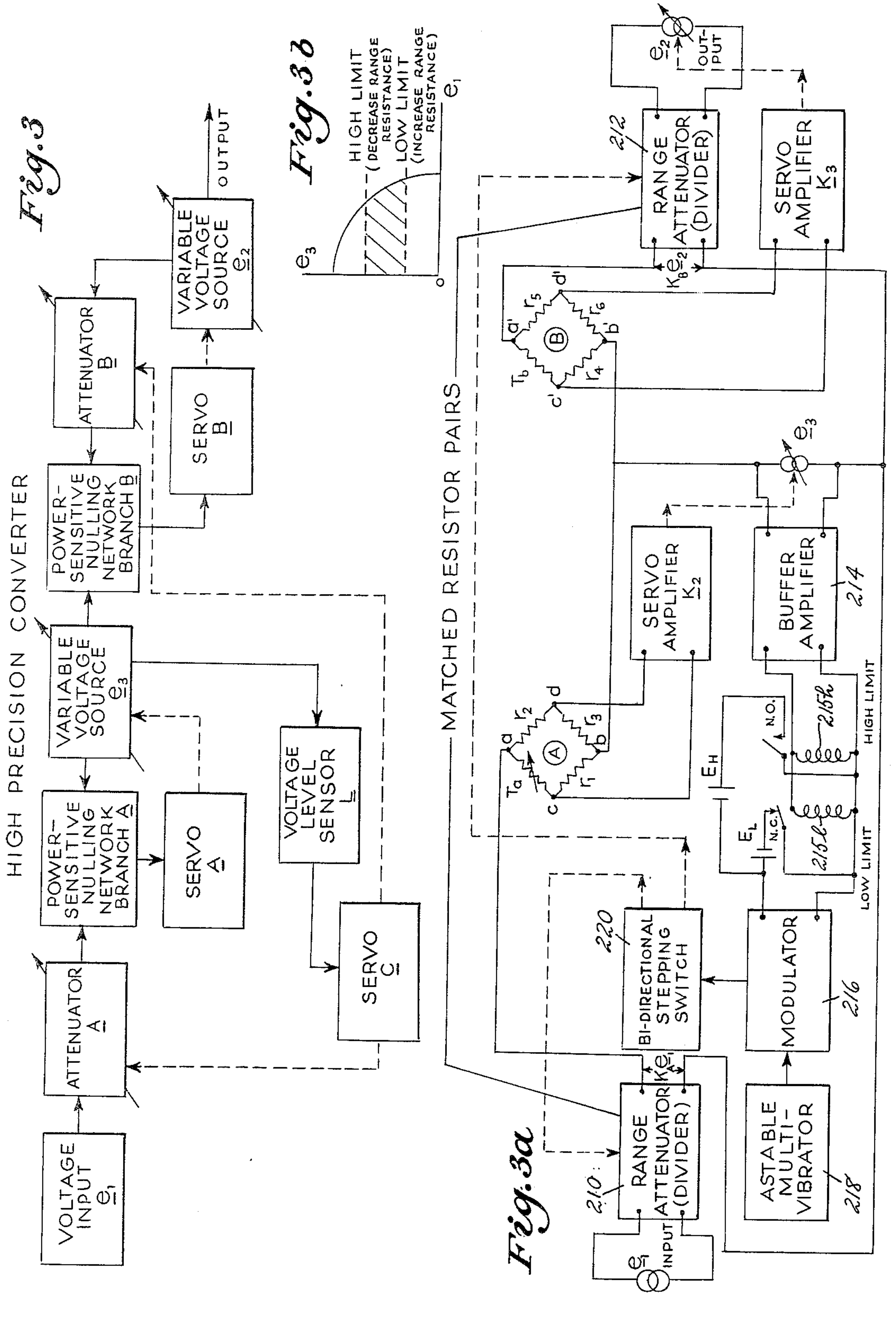
FIG. 3 is a block diagram of a modification of the RMS signal converter shown in FIGS. 2 and 2*a* which possesses greater accuracy and a wider range of operation.
FIG. 3*a* is a partly schematic and partly block diagram of an examplary circuit for the high accuracy, wide range RMS signal converter embodiment of FIG. 3.
FIG. 3*b* is a curve diagram showing the operation of the servo loop controlling the range resistor selection in the circuit of FIG. 3*a*.

Turning now to the third embodiment of the present invention, a modification of the RMS signal converter of FIGS. 2 and 2*a*, there is shown in FIG. 3 a block diagram of a signal conversion system employing a pair of matched attenuators, in conjunction with an additional variable signal source, in order to obtain an extremely accurate RMS signal converter having a far wider range of operation than the previously-described embodiment. In several respects this particular converter system is similar to that disclosed in said copending application, Ser. No. 627,846, referred to previously, and for a fuller mathematical development of the theory of operation of such a three signal RMS converter system reference is made to the disclosure contained in the latter application.

In FIG. 3 the signal to be converted, $e_1$, is supplied to the right-hand or A branch of a power-sensitive nulling network after a selective amount of voltage-dropping resistance has been inserted by the setting of a series-connected attenuator. Also coupled across the input of branch A of the nulling network is the output of a separate variable voltage source $e_3$ whose amplitude is controlled by a first servo loop (servo A) in a manner to be described.

In this embodiment the attenuator elements act merely as gross range adjusters on the system in response to the magnitude of the input signal level $e_1$. The fine adjustment in balancing the system to produce a null output across the respective power-sensitive network branches is provided by the setting of the amplitude level of the variable signal source $e_3$ in response to changes in the level of the input signal $e_1$.

Thus, considering again the left-hand portion of the block diagram of FIG. 3, the network branch A is balanced to a null output, once the gross range resistance is inserted in the circuit via the attenuator, by the adjustment of the amplitude level of the source $e_3$ so that the RMS summation of $e_1$ and $e_3$, which is applied across the power-sensitive network branch, is maintained at a predetermined fixed value so as to provide a zero-level error signal to the associated control servo. (In order for the respective signal sources $e_1$ and $e_3$ to add in RMS rather than linear fashion it is necessary that the source $e_3$ be selected so that its output is non-coherent in time phase or frequency with the input signal $e_1$.) In other words, the servo loop A adjusts the level of signal source $e_3$ so that the voltage applied across network branch A, $E_A$, satisfies the following relationship:

$$E_A=\sqrt{(k_A e_1)^2+e_3^2}=E \qquad (1)$$

where $k_A$ is the amount of attenuation introduced by the setting of the range attenuator A, and E is a constant.

The adjustment of the range attenuators in both circuit portions is controlled by a servo loop C which is actuated in response to the amplitude level of the signal source $e_3$, as detected by a voltage sensor L. Thus, when the fractional proportion required from the signal source $e_3$, in order to maintain the composite voltage level applied across the network branch A at the constant value for a null network output, become too small or too large relative to the input signal $e_1$, then the servo loop C steps in to change the range setting of the attenuators accordingly.

The right-hand or B portion of the systems shown in FIG. 3 is generally similar to that of the A side, except that a variable internal voltage source $e_2$, which acts as the output of the system, is substituted for the input signal source $e_1$, and the servo control loop is arranged somewhat differently. Thus, in the B circuit portion, both the output signal $e_2$ (after attenuation) and the additional signal $e_3$ are combined in RMS additive fashion to provide a composite applied voltage level across the associated power-sensitive nulling network branch B. (Again, RMS addition purposes, $e_2$ and $e_3$ must be non-coherent with each other, although $e_2$ can be coherent with the waveform of $e_1$.)

Since the range setting of attenuator B is controlled by the servo loop C, and the amplitude level of the source $e_3$ is controlled by the servo loop A, the only remaining variable element in the B circuit for nulling the output of network branch B is the voltage of the output signal source $e_2$. The level of this latter element is controlled by still another servo loop B, responsive to the output of network branch B, so as to maintain the composite voltage $E_B$ applied across the network branch at a fixed predetermined level, thus satisfying the following equation:

$$E_B=\sqrt{(k_B e_2)^2+e_3^2}=E \qquad (2)$$

where $k_B$ is the amount of attenuation introduced by the setting of the range attenuator B, and E is the same constant predetermined voltage level to which both of the network branches A and B are calibrated for a zero or null output.

Combining Equations 1 and 2 and squaring produces:

$$E_A^2=k_A^2e_1^2+e_3^2=E^2=k_B^2e_2^2+e_3^2=E_B^2 \qquad (3)$$

whereupon:

$$k_A^2e_1^2=k_B^2e_2^2 \qquad (4)$$

and, since the attenuation factor $k_A$ is matched so as to be as nearly as possible the numerical equivalent of the corresponding attenuation factor $k_B$, the relationship therefore reduces to:

$$e_1^2=e_2^2 \qquad (5)$$

meaning that the RMS value of the input signal $e_1$ equals the RMS value of the system output provided by the signal source $e_2$, and the desired RMS signal conversion has been obtained.

FIG. 3*a* is a schematic diagram of an exemplary circuit for the modified RMS signal converter embodiment of FIG. 3 employing as the respective nulling network branches a pair of Wheatstone bridge arrangements of power-sensitive thermistor elements, each similar to that used in the voltmeter circuit of FIG. 1*a*. From the previous detailed descriptions of the converter embodiment of FIGS. 2 and 2*a* and the generalized block diagram of FIG. 3, the function and operation of the specific circuit schematic shown in FIG. 3*a* should be readily apparent and, accordingly, only the aspects which distinguish this circuit from the previous arrangements will be described at length herein.

The left-hand circuit portion, in FIG. 3*a*, comprises an input signal source $e_1$ connected through an associated range attenuator 210 (which acts as a voltage divider) to a first nulling network A, formed of a thermistor $T_a$ and resistances $r_1$, $r_2$ and $r_3$ in a Wheatstone bridge arrangement. In series with the attenuated signal $k_Ae_1$ is a voltage signal supplied from a separate, variable potential source $e_3$. As explained previously, the waveform of $e_3$ is selected so as to be non-coherent with that of the input source $e_1$. Thus the composite voltage $E_{ab}$ applied across the input terminals of the thermistor bridge A is in effect the RMS addition of the two signal waves as follows:

$$E_{ab}=\sqrt{(k_A e_1)^2+e_3^2} \quad (6)$$

The function of servo amplifier $K_2$, which operates in conventional fashion, is to adjust the amplitude of the internal signal source $e_3$ so that the output developed across the terminals *cd* of thermistor bridge A remains nulled, and thus the voltage $E_{ab}$ applied across the bridge input is maintained at a fixed predetermined level, irrespective of any changes in the input signal $e_1$; that is:

$$E_{ab}=E \text{ (a constant)} \quad (7)$$

The function of the level sensing and control circuit is to adjust the setting of the variable-resistance potentiometer 210 to provide an appropriate attenuation factor $k_A$ into the circuit loop, both as a gross adjustment of the balancing circuit and also so that the amplitude level required of the signal source $e_3$ for bridge balance remains a significant fraction of the composite voltage signal $E_{ab}$ applied across the bridge input, even though the input signal source be varied over several orders of magnitude. This relationship is illustrated in the curve of FIG. 3*b* which is a plot of the voltage level $e_3$ required for bridge balance as a function of the input signal level $e_1$ (assuming for the time being that no voltage division is performed by the range attenuator 210, i.e., $k_A=1$). Since the RMS addition of the two signals must equal a constant for all values of $e_1$, then the curve of $e_3$ vs. $e_1$ follows the classic plot of a circle:

$$e_1^2+e_3^2=\text{a constant} \quad (8)$$

Unless some range adjustment means be provided to selectively attenuate one of the two voltage sources in the circuit, then it is apparent that, for relatively low values of $e_1$, most of the voltage contribution to the composite signal $E_{ab}$ which is applied to the power-sensitive bridge is derived from the source $e_3$; on the other hand, high values of $e_1$ require but a small contribution from the internal source $e_3$ in order to achieve bridge balance. (In fact, if the level of the input signal $e_1$ should be sufficiently great, then, in the absence of any adjustable attenuation means, the bridge A may be incapable of being balanced because a negative contribution would then be required from the source $e_3$.) For purposes of optimum sensitivity of the converter system it is desirable that the relative contributions of $e_1$ and $e_3$, which together form the RMS composite signal $E_{ab}$, be maintained within a close ratio range, so that one voltage level is never allowed to exceed the other, for example, by more than 3:1 or 4:1.

To the above end a voltage sensor is provided in the circuit of FIG. 3*a* in order to automatically change the resistance setting of the range attenuator 210 in the appropriate direction whenever the voltage contribution required from the signal source $e_3$ for bridge balance rises above or falls below respective range limits. (It will be apparent to those skilled in the art that the voltage sensor could alternativley monitor the level of the input signal $e_1$.) The operation of the voltage sensing circuit is illustrated in FIG. 3*b*, the effect of which is to confine the signal level of the internal source $e_3$ to operation within the shaded range. Thus, as indicated in the figure and tendency of the signal level of $e_3$ to rise above the "high limit" line, due to a decrease in the input signal $e_1$, would produce a decrease in the resistance setting of the attenuator 210, thus increasing the contribution of $e_1$ to the composite bridge voltage $E_{ab}$ and reducing in turn the contribution required from $e_3$. The opposite situation applies whenever there is any tendency of the signal level of $e_3$ which is required to maintain bridge balance to drop below the "low limit" point.

An exemplary arrangement of elements for achieving the automatic range adjusting operation just described is shown in FIG. 3*a*. The voltage level developed by the internal signal source $e_3$ is picked off and applied to a high-impedance buffer amplifier 214. The amplifier output, which is proportional to $e_3$, is applied across a pair of relays 215*h*, 215*l* which are set for actuation at high and low limit points respectively. Actuation of the high-limit relay 215*h* causes an associated pair of normally-open contacts to close, thereby applying a battery source $E_H$ of a first polarity across the input terminals of a modulator element 216. On the other hand, low-limit relay 215*l*, with its respective set of normally-closed contacts, would be held open so long as the level $e_3$ was above the low limit point, but these would close as soon as the voltage dropped below the low limit threshold, thereby connecting a battery source $E_L$ of opposite polarity to the modulator input.

Thus, depending upon the polarity of the voltage level applied to the input of the modulator 216 when the amplitude of voltage source $e_3$ moves outside the shaded range indicated in FIG. 3*b*, the modulator, in similar fashion to the embodiment of FIG. 2*a*, will polarity modulate the pulse train generated by the multivibrator 218. The modulator output will in turn actuate the stepping switch 220 in the proper direction to adjust the resistance setting of the voltage-divider range attenuator 210 at a new value of $k_A$ which will restore the relative levels of $e_1$ and $e_3$ so that each of the voltage sources makes a significant contribution to the composite RMS voltage E applied to the input of bridge A. The output of the stepping switch 20 is also ganged to a second matched attenuator 212 in the right-hand circuit portion so that its resistance setting $k_B$ at all times stays in step with that of the attenuator 210 in the left-hand circuit portion, or in other words, $$k_A=k_B \quad (9)$$

Considering now the right-hand portion of the circuit shown schematically in FIG. 3*a*, it will be observed that the output voltage source $e_2$, after proportional reduction by the associated voltage-divider attenuator 212 for range adjustment purposes, is combined in series with the internal voltage source $e_3$ to form a composite voltage level $E_{a'b'}$ which is applied to a nulling network B. Similar to network A, network B is in the form of a Wheatstone bridge arrangement of a thermistor arm $T_b$ and resistor arms $r_4$, $r_5$ and $r_6$. By initial calibration the bridge network is adjusted so that a null output is adjusted so that a null output is produced when the applied voltage to the bridge input terminals equals the predetermined fixed level E to which bridge A is also set.

The servo amplifier $K_3$ receives its control signal from the output of bridge B and functions to adjust the level of the output signal source $e_2$ so as to maintain the power-sensitive network B at null, even though the level of $e_3$ and the divider factor $k_B$ of attenuator 212 are changed in response to conditions occurring in the left-hand circuit portion.

From the foregoing description it should now be understandable how the circuit arrangement of FIG. 3*a* operates along the functional scheme of the generalized block diagram of FIG. 3 to adjust the various circuit parameters so that the conditions required for Equations 1–5 are satisfied—the result being that the output voltage $e_2$ is continuously maintained at an amplitude level which in the RMS equivalent of the input signal amplitude $e_1$, so that the desired signal conversion is obtained.

It will be understood by those skilled in the art that the various converter embodiments disclosed herein may be readily modified to include multiplier and/or additional attenuator means so as to introduce a constant proportional factor into the conversion effected between the input and output signals. Also, in lieu of resistive components, the attenuator elements shown in the several embodiments could be comprised instead of inductive, capacitive or combined reactive-resistive components, or even precision variable amplifier means of suitable known design.

As used in the specification and claims of this application, the terms "nulling network," "null signal," "null output," and terms of similar import are meant, and should be so construed, to include situations in which a zero level output signal is produced and also those situations in which an output signal of predetermined level is generated.

What is claimed is:

1. Apparatus for converting an input electrical signal, regardless of waveform or polarity, into an output electrical signal of a differing waveform whose RMS voltage level bears a constant proportional relationship to said input signal level comprising:

(a) a nulling network containing a power-sensitive element therein which is responsive to the RMS value of an electrical signal supplied thereto, said nulling network generating a null signal output at a single predetermined level of voltage applied to the input thereof, (b) first precisionally-adjustable attenuator means connecting to said nulling network an input electrical signal $e_1$ which is to be converted, (c) servo means coupled to receive the output of said nulling network as an error signal and acting to adjust the setting of said first attenuator means so as to maintain the voltage input to said network at said predetermined level, irrespective of any changes which occur in the level of said input signal $e_1$, (d) a source $e_0$ of fixed potential level having a waveform differing from that of signal, $e_1$, and (e) a second precisionally-adjustable attenuator means coupled as a voltage divider to said source $e_0$, said second attenuator being ganged with said first so that the settings of both are commonly and equally adjusted by said servo means, whereby the RMS level of the resultant voltage developed by said voltage divider provided by said second attenuator serves as the converted output signal for said apparatus.

2. The apparatus of claim 1 additionally modified to also serve as a digital voltmeter for indicating the RMS voltage level of said input signal $e_1$, said modifications including that said first and second attenuator means are each adjustable in precision digital increments and that indicator means are provided for visually displaying a numerical figure representative of the particular digital setting of one of said attenuator means when said network is at null, whereby said number is also indicative of the RMS voltage level of said input signal $e_1$.

3. A precision RMS converter of electrical signals comprising:

(a) means for receiving a first signal source $e_1$ as an input to said converter, (b) a second signal source $e_2$ of adjustable amplitude level serving as an output of said converter, (c) first and second nulling network branches each containing a power-sensitive element therein which is responsive to the RMS value of an electrical signal supplied thereto, said branches each being calibrated to produce a null signal output for the same singular voltage level E applied to their respective inputs, (d) first and second adjustable attenuator means of matched electrical characteristics, said first attenuator coupling said first signal $e_1$ to the input of said first network branch, and said second attenuator correspondingly coupling said second signal $e_2$ to said second network branch, (e) first servo means connected to receive the output of said first network branch as an error signal and acting, in response to changes in the level of said first signal $e_1$, to adjust equally the commonly-ganged settings of said first and second attenuator means, the servo adjustment of said first attenuator setting serving to maintain the voltage input to said first network branch at said predetermined level E for null output, and (f) second servo means connected to receive the output of said second network branch as an error signal and acting, in response to changes in the setting of said second attenuator, to adjust the amplitude level of said second signal $e_2$ so as to maintain the voltage input to said second network branch at said predetermined level E for null output, whereby the desired RMS signal conversion between input and output is obtained.

4. The converter apparatus of claim 3 characterized in that the respective power-sensitive element in each of said first and second network branches is a thermocouple whose output is compared against a reference source of predetermined DC potential, the resultant voltage constituting the output of said respective network branch.

5. The converter apparatus of claim 3 characterized in that said first and second attenuator means are adjustable in digital increments; and said first servo means comprises a modulator coupled to the output of said first network branch for generating a train of electrical pulses when said network branch becomes temporarily unbalanced due to an instantaneous change in the level of said first signal $e_1$, the polarity of said pulses being determined by the direction of said network branch unbalance away from the null condition, and a bidirectional stepping switch connected to receive said modulator pulses and actuated thereby to change the respective commonly-ganged settings of said first and second attenuators in digital increments in a direction determined by the polarity of said pulses.

6. A wide-range precision RMS converter of electrical signals comprising (a) means for receiving a first signal source $e_1$ as an input to said converter, (b) a second signal source $e_2$ of adjustable amplitude level serving as an output of said converter, (c) first and second nulling network branches each containing a power-sensitive element therein which is responsive to the RMS value of an electrical signal supplied thereto, said branches each being calibrated to produce a null signal output for the same singular voltage level E applied to their respective inputs, (d) first and second adjustable range attenuators of matched electrical characteristics, said first attenuator coupling said first signal $e_1$ to the input of said first network branch, and said second attenuator correspondingly coupling said second signal $e_2$ to said second network branch, (e) a third signal source $e_3$ of adjustable amplitude coupled through respective circuit means to each of the inputs of said first and second network branches, (f) first servo means for adjusting the amplitude level of said third signal $e_3$, in response to changes in the instantaneous level of said first signal $e_1$, so as to maintain the composite voltage level applied to the input of said first network branch at said predetermined amplitude E for null output, (g) second servo means for adjusting the amplitude level of said second signal $e_2$, in response to changes in the instantaneous level of said third signal $e_3$, so as to maintain the composite voltage level applied to the input of said second network branch at said predeterminend level E for null output, whereby the desired RMS signal conversion between input and output is obtained, and (h) range adjustment means for automatically adjusting equally the commonly-ganged settings of said first and second range attenuators so as to maintain within predetermined limits the relative voltage ratios of $e_1$ to $e_3$ and $e_2$ to $e_3$ when said respective first and second network branches are nulled.

7. The converter apparatus of claim 6 wherein said range adjustment means comprises a voltage sensor which is connected to respond to a voltage level of said third signal $e_3$ which fails outside of a voltage band defined by high and low threshold points, and a third servo means receiving the output of said voltage sensor which acts to adjust the commonly-ganged settings of said first and second range attenuators in a direction so as to restore said relative voltage ratios of $e_1$ to $e_3$ and $e_2$ to $e_3$ within said predetermined limits.

8. The converter apparatus of claim 6 characterized in that each of said first and second nulling network branches is in the form of a Wheatstone bridge having a thermistor or current-dependent resistance element in at least one arm thereof which acts as said power-sensitive element.

9. The converter apparatus of claim 6 characterized in that said first and second range attenuators are each in the form of variable-resistance potentiometers which are connected as voltage dividers across said respective first signal $e_1$ and second signal $e_2$.

References Cited

UNITED STATES PATENTS

| | | | |
|---|---|---|---|
| 3,037,167 | 5/1962 | Hovda et al. | 324—95 |
| 3,048,778 | 8/1962 | Rumpel | 324—99 XR |
| 3,159,787 | 12/1964 | Sexton et al. | 324—99 |
| 3,302,112 | 1/1967 | Hyer | 324—99 |

RUDOLPH V. ROLINEC, Primary Examiner

E. F. KARLSEN, Assistant Examiner

U.S. Cl. X.R.

323—94, 106

UNITED STATES PATENT OFFICE
CERTIFICATE OF CORRECTION

Patent No. 3,486,110 Dated December 23, 1969

Inventor(s) Loebe Julie

It is certified that error appears in the above-identified patent and that said Letters Patent are hereby corrected as shown below:

Column 11, line 70, formula (1), the equation should read $$E_A = \sqrt{(k_A e_1)^2 + e_3^2} = E$$

Column 12, line 33, formula (2), the equation should read $$E_B = \sqrt{(k_B e_2)^2 + e_3^2} = E$$

SIGNED AND SEALED
MAY 12 1970

(SEAL)
Attest:

Edward M. Fletcher, Jr.
Attesting Officer

WILLIAM E. SCHUYLER, JR.
Commissioner of Patents